United States Patent [19]

Werner

[11] Patent Number: 5,074,056
[45] Date of Patent: Dec. 24, 1991

[54] DEVICE FOR DRYING WINDSHIELD BREAKS AND METHOD

[76] Inventor: Frank D. Werner, Box SR9, Jackson, Wyo. 83001

[21] Appl. No.: 574,751

[22] Filed: Aug. 29, 1990

[51] Int. Cl.$^5$ .............................................. F26B 3/00
[52] U.S. Cl. ................................... 34/22; 34/243 R; 34/243 C; 15/405; 15/322; 239/284.1; 239/DIG. 21; 251/339
[58] Field of Search ................. 34/19, 20, 22, 90, 91, 34/243 R, 243 C; 15/300.1, 320, 321, 405, 415.1, 322, 309; 239/284.1, DIG. 21; 251/339

[56] References Cited

U.S. PATENT DOCUMENTS

| | | | |
|---|---|---|---|
| 1,880,948 | 10/1932 | Evennett | 15/405 |
| 1,945,810 | 2/1934 | Holtz | 15/405 |
| 2,699,403 | 1/1955 | Courts | 15/309.2 |
| 2,803,892 | 8/1957 | Hurst | 15/309.2 |
| 3,117,726 | 1/1964 | Schöberg | 15/405 |
| 3,661,315 | 5/1972 | Helton | 15/405 |
| 3,993,520 | 11/1976 | Werner et al. | 156/94 |
| 4,060,874 | 12/1977 | Furutsutsumi | 15/405 |
| 4,133,345 | 1/1979 | Mitchell | 251/339 |
| 4,170,805 | 10/1979 | Kumagai | 15/322 |
| 4,364,147 | 12/1982 | Biedermann et al. | 15/405 |
| 4,872,238 | 10/1989 | Crotis et al. | 34/243 C |

*Primary Examiner*—Henry A. Bennet
*Assistant Examiner*—Denise L. F. Gromada
*Attorney, Agent, or Firm*—Kinney & Lange

[57] ABSTRACT

A device is provided for removing moisture and small particles of debris from windshield breaks and the like. The device includes a nozzle for discharging air. The nozzle has a shirt portion with a planar edge. A compressed air supply is discharged through the nozzle. A method also is provided for removing moisture and small particles of debris from windshield breaks and the like. The method includes positioning the nozzle having a skirt with a planar edge over the windshield break. Then, compressed air is discharged through the nozzle mechanism. The compressed air has an initial pressure and a central core area. The central core area has a pressure substantially equal to the initial pressure of the compressed air. The nozzle mechanism is positioned such that the central core is directed at only a portion of the windshield break.

4 Claims, 2 Drawing Sheets

DEVICE FOR DRYING WINDSHIELD BREAKS AND METHOD

BACKGROUND OF THE INVENTION

The present invention relates to a device for removing moisture and small particles of debris from windshield breaks, prior to repair, and a method of using the device.

Stone or gravel impact damages on windshields of multi-layer safety glass frequently cause only damages in the uppermost glass layer. It is well known that a windshield break of this kind can be repaired by injecting a liquid resin into the crack of the windshield. A repair device is illustrated in U.S. Pat. No. 3,993,520.

To obtain a high quality repair, however, any water or other debris must be removed from the crack in the windshield before injecting resin. Resin cannot tolerate more than a trace of water if a satisfactory repair is to be achieved. Ordinarily, the typical lab or shop drying is slow and tedious and involves using agents such as acetone (as disclosed in U.S. Pat. No. 3,993,520). Air jets from conventional hand-held air nozzles also have been used. In addition, many times the amount of water which remains within the crack after typical drying is, for the most part, unknown.

SUMMARY OF THE INVENTION

A device is provided for removing moisture and miscellaneous debris from windshield breaks and the like. The device includes a nozzle member for discharging air. The nozzle member has a skirt portion with an edge that lies on a plane. A compressed air supply is discharged through the nozzle member. Preferably, the skirt portion is a rigid material, but optionally may be somewhat flexible. An on-off valve is desirable to minimize waste of compressed air.

The control valve may optionally comprise a valve stem assembly having a valve stem extending from a valve head which closes on a valve seat. The valve stem is located substantially within the nozzle member and is connected to the valve seat. Exerting pressure on the valve stem moves the valve head away from the seat such that the air will discharge through the nozzle member. The valve is similar to the valve used for tire inflation.

The preferred method of using the nozzle includes positioning the skirt of the nozzle partially over the windshield break. Then, compressed air is discharged through the nozzle. The compressed air is maintained in an air column that has a central core. The central core area has a pressure substantially equal to the initial pressure of the compressed air. The nozzle mechanism is positioned such that the central core is directed at one edge portion of the windshield break with part of the nozzle skirt over the break and part outside the break. Externally, the edge of the nozzle is held gently against the windshield surface to prevent much air from leaking under the edge of the skirt. Air thus must flow down into the break, partly around, and then out the other part of the opening. This flow carries out water and small particles quickly.

DETAILED DESCRIPTION OF THE PREFERRED EMBODIMENTS

Figure 1:
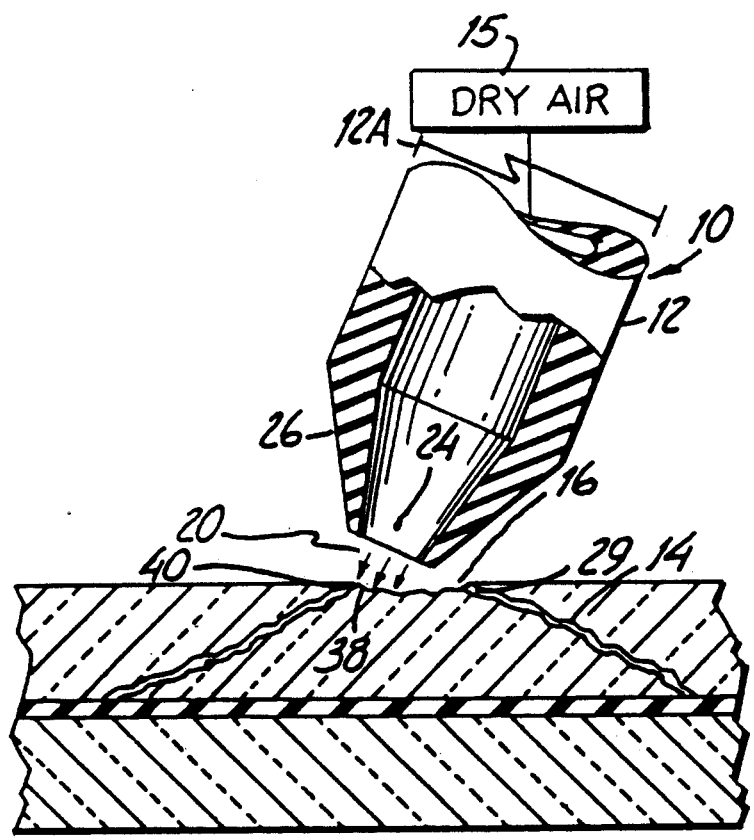
FIG. 1 is a perspective view of a windshield break drying device made according to the present invention and positioned above a windshield break.

The windshield break drying device of the present invention is generally indicated at 10 in FIG. 1. The device 10 includes a nozzle 12 at an end of a tube section 12A of size so it can be hand-held. The nozzle is designed to be used to dry a windshield break 14 having a break opening 16. The windshield break 14 is of the bulls-eye type associated with a multi-layer (sandwich safety-glass) windshield 18, though the device is also useful for other types of breaks, such as star breaks.

The nozzle 12 is made to direct a fluid stream 20 or column toward the break opening 16, whose pressure decreases as it leaves the nozzle 12. The nozzle 12 of the present invention is adapted to discharge compressed air or compressed dried air or other compressible fluids, such as inert gases and the like, which aid in drying windshield breaks 14. The compressed air is provided by an air supply system 15. The source of the compressed air can be a compressor of usual design operated through suitable valves and, if desired, a regulator.

The valve may be the internally mounted valve stem previously mentioned or may be any other valve arrangement, such as a thumb or finger operated valve (not shown).

The nozzle 12 includes a nozzle exit port 24 as best illustrated in FIG. 1. The nozzle port 24 defines the cross-sectional area of the flow from the nozzle 12.

The nozzle 12 includes a skirt portion 26 which allows the fluid stream 20 passing through the nozzle 12 to be defined in a specific flow pattern as best illustrated in FIG. 1. The skirt portion 26 is preferably integral to the nozzle mechanism 12. However, a skirt portion 26 which is separate from the nozzle 12, but securely attached thereto, is within the scope of the present invention.

In an optional embodiment of the present invention, the skirt portion 26 comprises a rubber sleeve or tubing, which will allow the skirt portion 26 to conform or partially conform to a portion of the windshield 18 to reduce unwanted air leakage.

Preferably, the skirt portion 26 includes a planar edge surface 28. The planar edge surface 28 defines and surrounds the exit port 24 such that fluid passes through the exit port 24, and then past the planar edge 28. When the nozzle 12 is placed against the windshield break 14, the planar edge will roughly conform with at least a portion of the surface of the windshield 18 to reduce air leakage, or rather closely conform if it is made of rubber.

Figure 3:
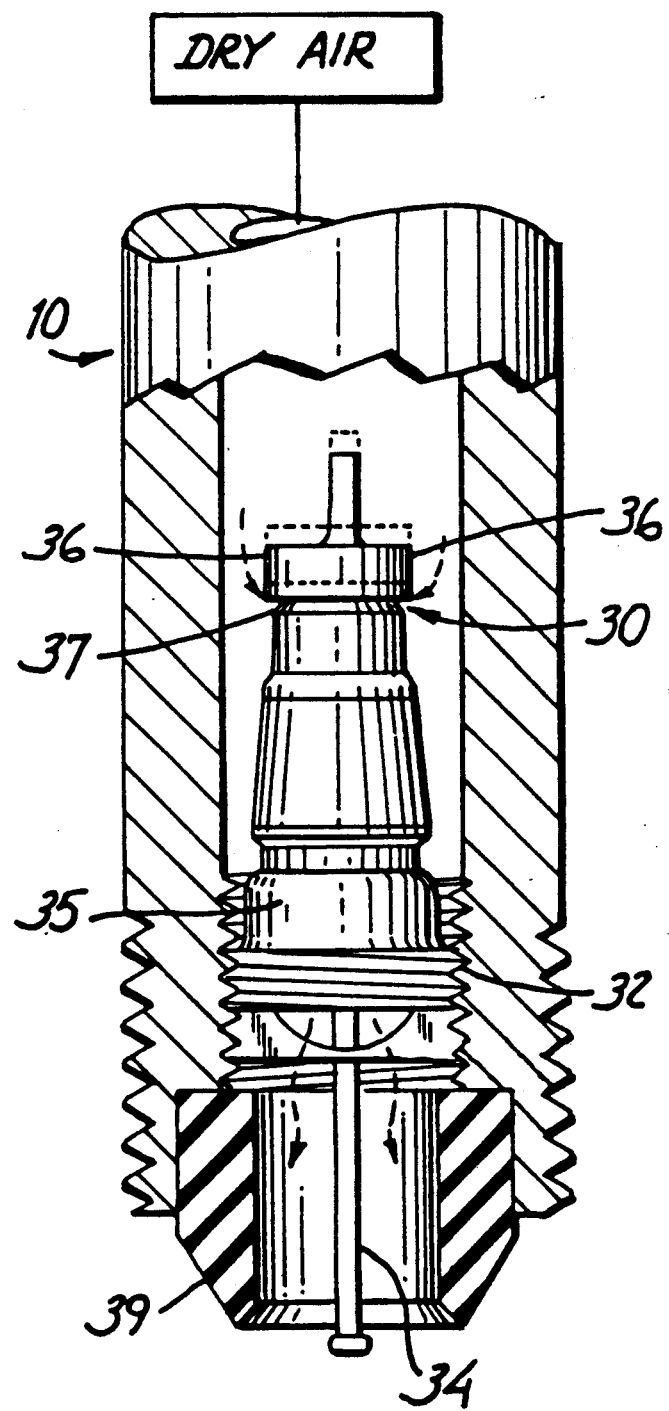
FIG. 3 is a sectional view of an optional controlling mechanism for controlling the amount of air released through the nozzle mechanism of the windshield break drying device made according to the present invention.

In the embodiment illustrated in FIG. 3, the nozzle can be formed with an internal valve 30 for controlling the nozzle. The valve 30 comprises a valve stem assembly 32 having a valve stem 34 which has a valve head 36, which in turn closes on a valve seat 37 formed on a valve body 35. The arrangement is made to operate like a conventional tire valve. The valve stem 34 is slidable in the valve body 35 and is spring loaded so the valve head 36 will be urged closed. An end portion of the stem 34 extends out of a nozzle end 39, and exerting force on the end of valve stem 34 moves the valve head 36 off the valve seat 37 so that the fluid will discharge through the nozzle 39. The nozzle 39 functions identically to nozzle end 26 insofar as flow control is concerned. Nozzle 39 has an edge 38 that also will tend to seal on a windshield surface under downward pressure when the nozzle 39 is moved toward the windshield. The stem 34 will contact the windshield and it will be moved to open the valve and permit air to exit.

As shown typically in FIG. 1, the flow fluid stream 20 leaves the nozzle 12. The central core 38 has a total pressure (or pitot pressure) which is substantially undiminished from the initial pressure of the fluid supply pressure for a distance downstream from the exit port 24 equal to a number of diameters of the exit port. The actual distance depends on the Reynolds number of the fluid flow.

As long as the diameter of the central core 38 of the air jet from the nozzle is smaller than the windshield break 14, the central core 38 will be capable of impinging an edge 40 of the break opening 16, allowing much of the remaining edge of the break opening 16 to be exposed to atmospheric air. Maintaining the remaining edge at atmospheric pressure facilitates the drying of the windshield break 14 because air, water and debris can escape from the crack opening.

When the nozzle port 24 is positioned away from the windshield break 14, manual aiming of the fluid stream such that a portion of the central core 38 impinges the break opening 16 is rather difficult. However, when the exit port 24 is positioned either against the windshield 18 or very close to the windshield 18, as illustrated in FIG. 2, aiming at the windshield break 14 is much more simple because a typical break opening may be only between approximately 0.8 inches to approximately 0.10 inches (2.03 mm to 2.54 mm) while the internal diameter of the nozzle may be only approximately 0.02 inches (1.51 mm).

Figure 2:
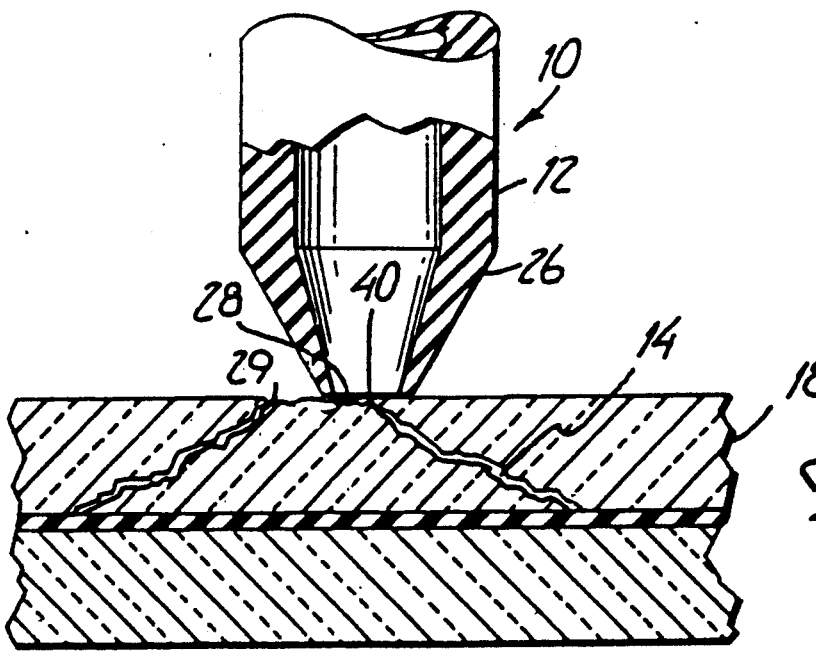
FIG. 2 is a perspective view of the windshield drying apparatus of the present invention positioned against the windshield break.

Accordingly, it is preferable, as illustrated in FIG. 2, for ease of use, best performance, and least air consumption, that the nozzle 12 be placed such that the planar edge 28 of the end portion 26 is against the surface of windshield 18, rather than being held a small distance away. If the nozzle 12 is not placed against the windshield 18, the operator must hold the nozzle mechanism 12 very steady, and must closely estimate where the central core 38 of the fluid stream 20 is located.

Although glass is rather stiff and rigid, it deforms appreciably under the action of the internal air pressure developed by this drying process. Thickness of break 14 is small, of the order of 0.0001 to 0.001 inch, so even a slight elastic deformation of the glass due to internal air pressure helps to admit more air and enhance the drying process. Such deformation is significant even for star breaks, as can be shown by non-rigid body deformation theory.

Accordingly, it is desirable that the nozzle tip be only lightly pressed against the edge of the break so that the nozzle tip does not tend to force the edge of the break closed during the dry-out process. This, together with its simplicity, makes the arrangement of FIG. 2 preferable to that of FIG. 3.

A known dry-out method is to introduce such a liquid as acetone into the break. It dissolves water and evaporates quickly, taking water out as it evaporates. This method is much quicker and more effective if the present device is applied to speed removal of such added liquid.

In all embodiments of the device, the pressure difference between the portion of the break which is near atmosphere pressure shown at 29 and the portion situated directly under the nozzle mechanism 12 is what removes the water and small particles of debris from the windshield break 14. The water and small particles of debris are forced out by the air entering the break from the nozzle. The air tends to circulate through the break to the uncovered portion, thus drying and cleaning the break. In accordance with the present invention, the air pressure at the nozzle exit 24 of the nozzle mechanism 12 should preferably be between approximately 50 psig to approximately 80 psig.

A method is provided for removing any moisture and miscellaneous debris from the windshield break 14. The method includes positioning the nozzle mechanism 12 and the skirt portion 26 of nozzle 12 over the windshield break 14. Then, discharging air into the windshield break 14 through the nozzle mechanism 12 such that the central core 38 of the air jet is directed at only a portion of the break opening 16 for the reasons described above.

The planar edge 28 of the skirt portion 26 is preferably pressed gently against the break opening 16 as shown in FIG. 2. Once again, it is important for the nozzle 12 to be positioned on the windshield break 14 such that one edge portion 40 of the break opening 16 is inside the skirt portion 26 and the remaining edge portion is outside of the skirt portion 26. The fluid stream 20 flows down into the windshield break 14, partly around, and then out the other part 29 of the break opening 16.

The nozzle portions in FIGS. 1 and 2 are reversed but the portions covered by the nozzle and left open are numbered identically.

The method herein described removes between approximately 90 percent to approximately 99 percent of the contained water almost instantly. The air flow is continued for one or two minutes for the purpose of causing ordinary evaporation to remove the remaining water.

Although the present invention has been described with reference to preferred embodiments, workers skilled in the art will recognize that changes may be made in form and detail without departing from the spirit and scope of the invention.

What is claimed is:

1. A method for removing moisture and miscellaneous debris from a windshield break having a break opening which opens to a windshield surface, the method comprising:

positioning a nozzle means over a windshield break; and discharging compressed air, the compressed air having an initial pressure and a central core area with a pressure substantially equal to the initial pressure of the compressed air, through the nozzle means such that the central core is directed at only a portion of the windshield break.

2. The method of claim 1 wherein nozzle means has a skirt having a planar edge.

3. The method as claimed in claim 1 including the step of positioning the nozzle means against the windshield surface and partially encompassing only a portion of the windshield break.

4. The method of claim 3 including the step of providing a resilient material nozzle means adjacent the planar edge, and urges the planar edge against the windshield surface to prevent substantial escape of air other than through the windshield break and out an uncovered portion of the break opening.

* * * * *